March 21, 1944.  B. J. YANCHENKO  2,344,763
SAFETY OPERATING CONTROL FOR MACHINES
Filed Sept. 17, 1941   4 Sheets-Sheet 1
FIG. 1
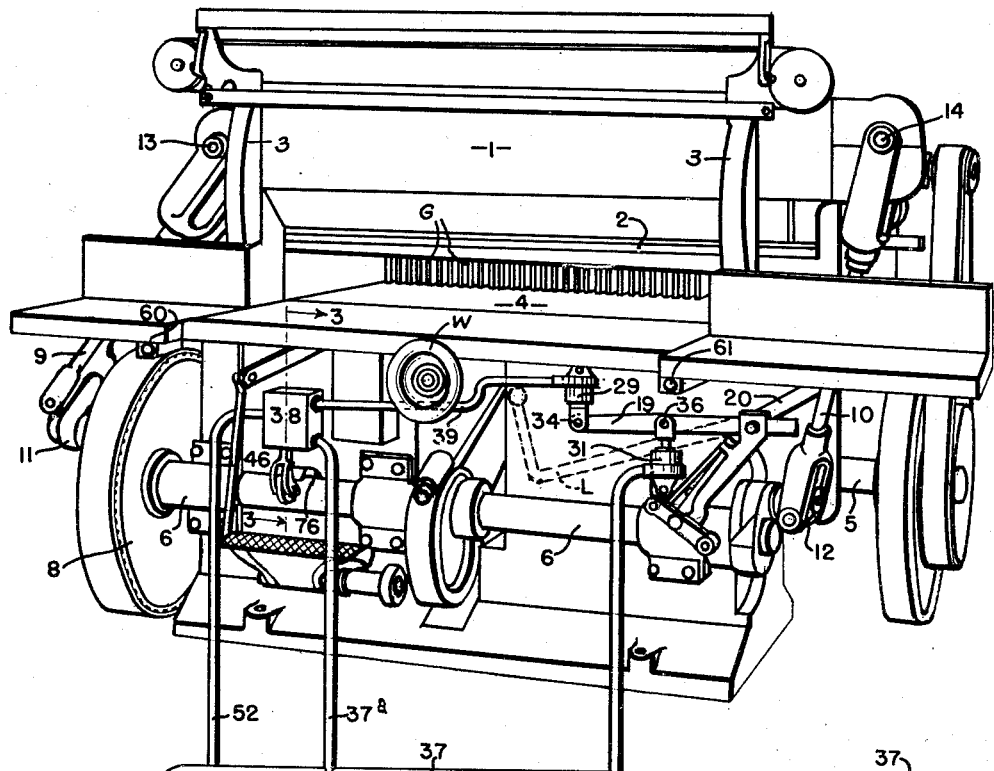
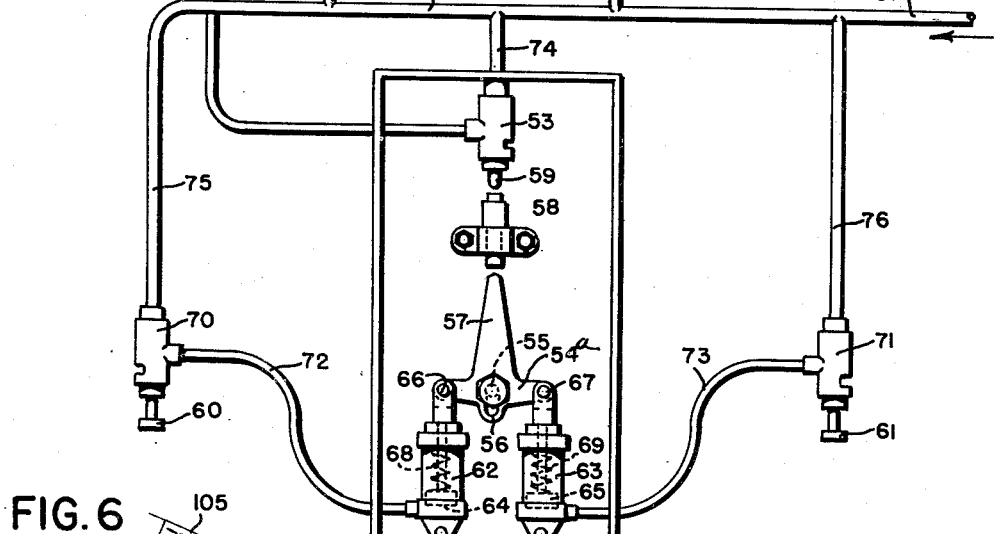
FIG. 6
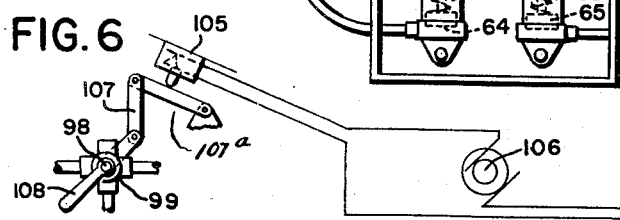
INVENTOR
BASIL J. YANCHENKO
BY
ATTORNEYS

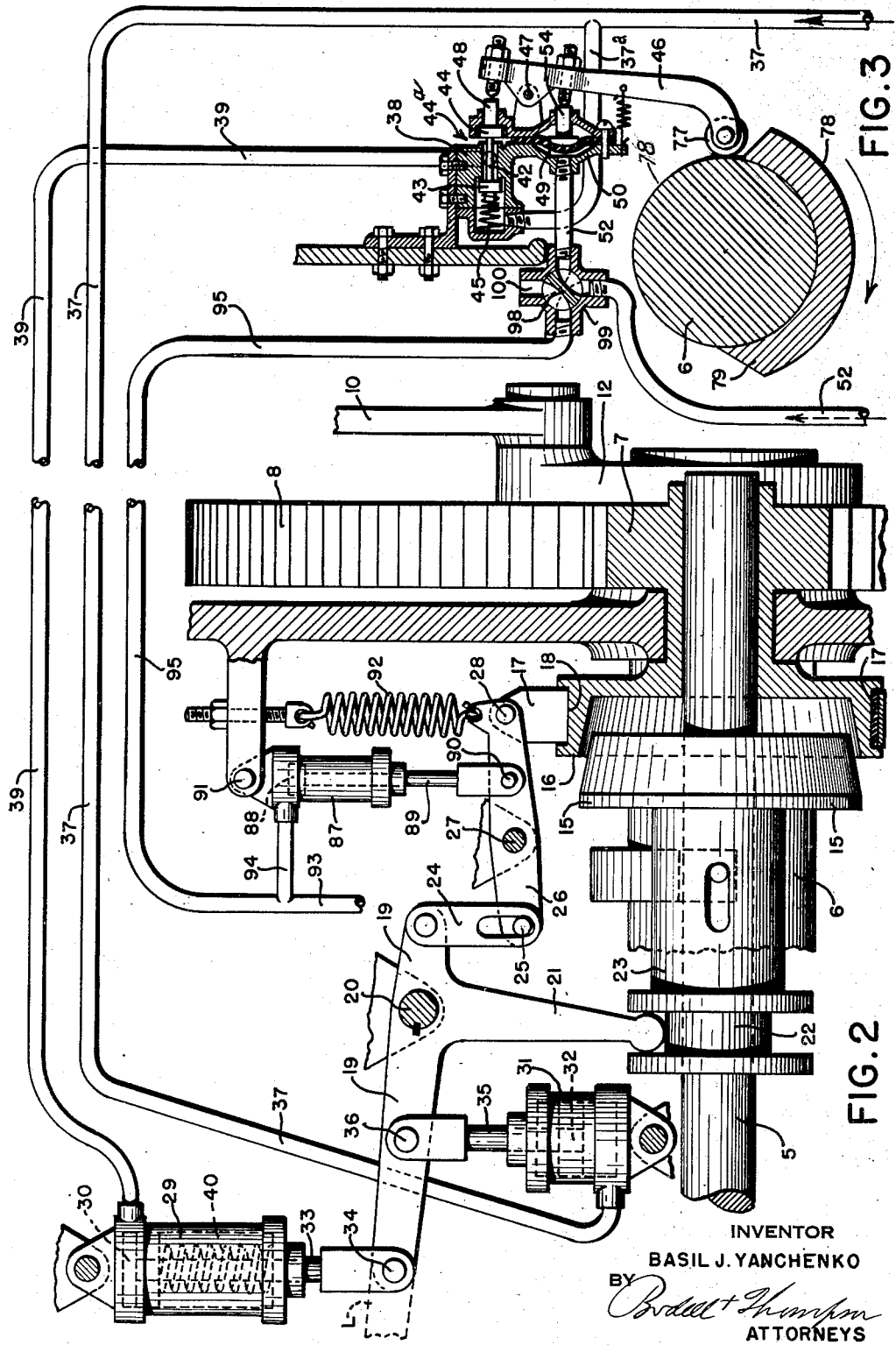

March 21, 1944. B. J. YANCHENKO 2,344,763
SAFETY OPERATING CONTROL FOR MACHINES
Filed Sept. 17, 1941 4 Sheets-Sheet 3

INVENTOR
BASIL J. YANCHENKO
BY
ATTORNEYS

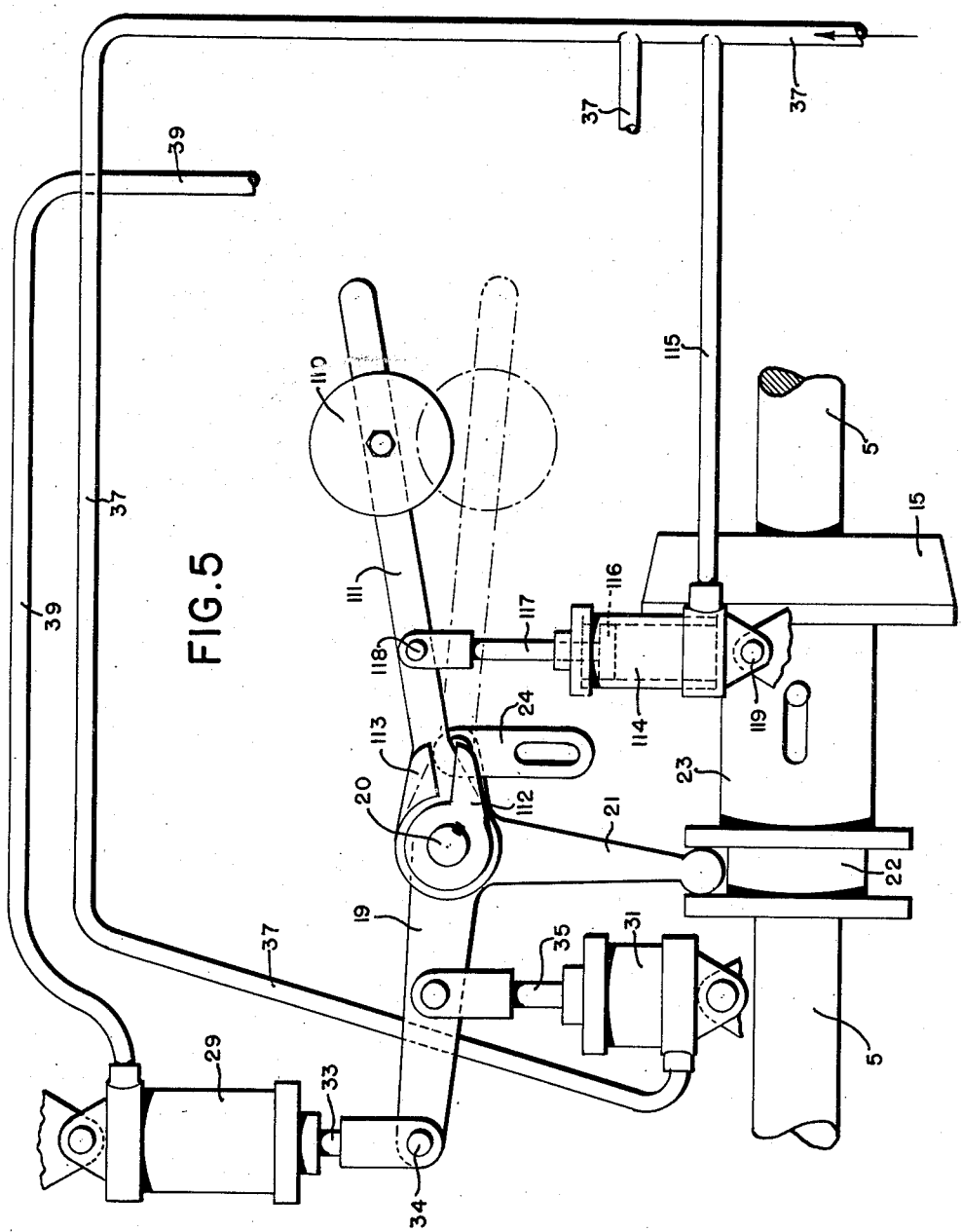

Patented Mar. 21, 1944

2,344,763

UNITED STATES PATENT OFFICE 2,344,763

SAFETY OPERATING CONTROL FOR MACHINES

Basil J. Yanchenko, Syracuse, N. Y., assignor to The Prosperity Company, Inc., Syracuse, N. Y., a corporation of New York Application September 17, 1941, Serial No. 411,202

7 Claims. (Cl. 192—131)

This invention relates to machines having an operating movement dangerous to the operator, as machines having an opening and closing movement, as for example, cutting machines having a knife movable toward and from a work table, presses having a movable press head, etc., and has for its object a pneumatic safety mechanism, preferably controlled by a two hand control mechanism, which pneumatic mechanism operates to start the machine upon the operation of the two hand control, and also positively stop it, if one or both manuals of the two hand control are released, while the machine is in the dangerous period of its operating cycle.

It further has for its object a pneumatic or power mechanism embodying two pressure operated motors acting oppositely on a control member or lever of the machine, one motor being controlled by the two hand control, and the other being under continuous energization, the former motor being of sufficiently greater force, when energized, to overcome the latter, and hence operate the control member or lever of the machine against the restraining and returning action of the latter motor.

It further has for its object a power operated inching mechanism operable to originally locate the movable element of the machine, as a knife, when a replacement knife is being installed.

Other objects appear throughout the specification.

The invention is here illustrated as embodied in a paper cutting machine, known as a square cutter, but is applicable to other machines having an operating movement dangerous to the operator.

The invention consists in the novel features and in the combinations and constructions hereinafter set forth and claimed.

In describing this invention, reference is had to the accompanying drawings in which like characters designate corresponding parts in all the views.

Figure 1 is a front, perspective view of a so-called square cutter embodying the invention, a two hand control being shown diagrammatically.

Figure 2 is an enlarged detail view, partly in section, of the clutch and brake mechanism and contiguous parts, and the power or pneumatic operating means for the clutch and brake.

Figure 3 is an enlarged detail sectional view of the master valve of the two hand control and contiguous parts taken approximately on the plane of line 3—3, Figure 1.

Figure 5 is a view showing a modification of the control mechanism shown in Figure 2.

Figure 6 is a diagrammatic view showing mechanism for cutting out the motor of the machine when a valve is operated to cut in the inching mechanism and cut out the master valve of the two hand control.

Figure 4:
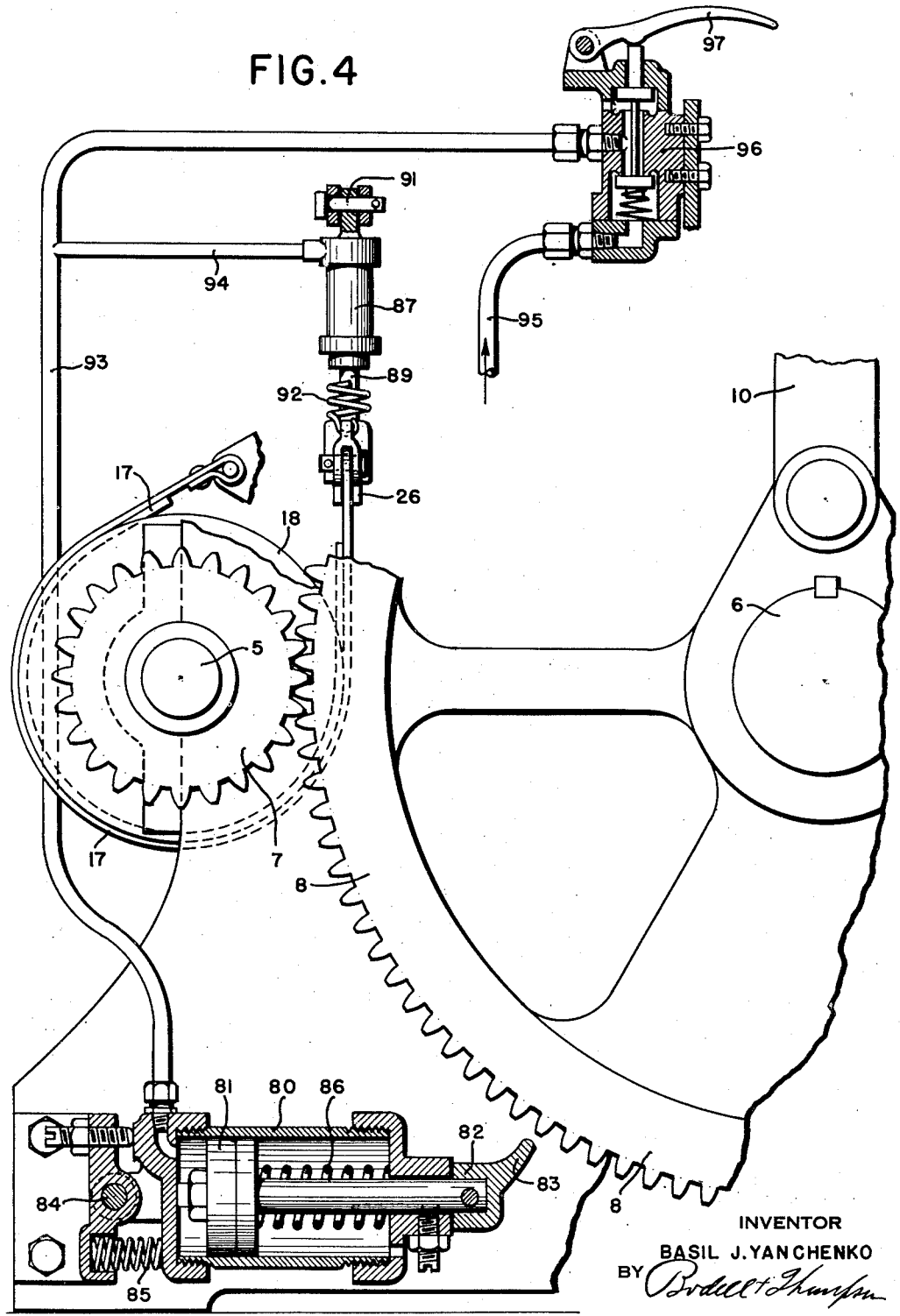
Figure 4 is an enlarged diagrammatic detail view of the inching mechanism for precision setting of the knife.

The square cutter here illustrated itself forms no part of the invention. The invention relates to the two hand control power control mechanism for actuating mechanism of the machine. The square cutter is used primarily to accurately cut photographic films and is operated in a dark room illuminated only by red bulbs.

The square cutter here illustrated, to which the invention is applied, comprises a suitable supporting frame, a head or frame 1, for a knife 2 vertically and longitudinally movable in guides 3 toward and from a work table 4, and actuating mechanism for the knife carrying frame or head and other moving parts of the machine. The machine is provided with a suitable gage G for locating the film relatively to the knife. The gage is adjustable by mechanism including a hand wheel W.

The actuating mechanism includes a drive shaft 5 and transmission mechanism including a transmission or counter shaft 6, both suitably mounted in the frame of the machine, means, as intermeshing gears 7, 8 on said shafts for transmitting the power from the drive to the transmission shaft, and a clutch operable to connect and disconnect the drive and the transmission shafts.

The motion of the transmission shaft is translated to the reciprocating knife head or frame 1 through suitable mechanism, as connecting rods 9, 10 connected at like ends to cranks 11, 12 at opposite ends of the shaft 6 and at their other ends at 13, 14 to the knife head 1.

15 designates the shiftable member or section of the clutch, this being slidably keyed to the drive shaft 5 and shiftable axially thereof into and out of engagement with a complemental clutch member or section 16 rotatable with the drive gear or pinion 7, which is rotatably mounted on the drive shaft 5. 17 is a brake band coacting with a brake drum 18 on the driven clutch section 16.

Heretofore, in machines of this type, the clutch section 15 has been operated or controlled by a lever L shown in dotted lines (Figure 1), the lever operating to release the brake, when the clutch is being engaged, and to apply the brake when the clutch is being disengaged.

In the power or pneumatic control mechanism forming the subject matter of this invention, this lever L is displaced by a power or pneumatically operated control member or lever, the power or pneumatic mechanism being controlled by a two hand control mechanism.

19 designates the control member or lever, this being shown as keyed to an operating shaft 20 rotatably mounted in the machine frame, and as connected at one end to a motor to be described, and as having an angular arm 21 coacting with the shifting collar 22 on the sleeve or hub 23 of the shiftable clutch section 15. The lever 19 is connected to the brake band 17 to operate it through suitable means, as a link 24, pivotally connected at 25 to one arm of a brake operating lever 26 pivoted between its ends at 27 to the machine frame and at its other end at 28 to one end of the brake band.

The clutch and brake are operated by pressure or pneumatic devices or motors acting oppositely on the lever 19. These are here shown as two separate units, each consisting of a cylinder and piston, the cylinder and piston, which act to engage the clutch and release the brake, acting with sufficiently greater force on the shiftable clutch section 15 through the lever 19, than the cylinder and piston acting to disengage the clutch and apply the brake.

29, 30 designate the cylinder and piston operating to engage the clutch and release the brake; 31, 32 designate the cylinder and piston operating to disengage the clutch and release the brake. The rod 33 of the piston 30 is pivoted at 34 to the lever 19, and the rod 35 of the piston 32 is pivoted at 36, the lever 19 nearer the shaft 20 than the pivot 34. The cylinder 29 is connected to a main power line or conduit 37 through a master valve 38 controlled by the two hand control mechanism; and the cylinder 31 is connected in constant communication with a source of pressure fluid or the main line 37. When the valve 38 is opened by the operation of the two hand control and the air flows through the valve 38 and conduit 39 to the cylinder 29, actuates the piston 30, and hence the lever 19 to shift the clutch 15 "in" and release the brake band 17. The pressure on the piston 30 through the lever 19 being sufficiently greater than that on the piston 32 to overcome the pressure on the piston 32. At any time the pressure in the cylinder 29 is released, the piston 32 under constant pressure re-acts to throw out the clutch and apply the brake. As a precaution, to insure stopping of the machine in case the air pressure fails, when the machine is in a critical or dangerous period in its cycle of operation, mechanical means may be provided to throw out the clutch and apply the brake. As shown in Figure 2, a returning spring 40 is located in the cylinder 29 around the piston rod 33 and thrusts against the piston 30 in opposition to the air pressure through the conduit 39. In Figure 5 to be described, a counter weight is used to perform the function of the spring.

The valve 38 is operated by a two hand control, and held open by the two hand control a predetermined period in the operating cycle of the machine, and held open during the remainder of the cycle, by a part, as a cam, actuated by the transmission mechanism of the machine. The predetermined period is while the knife 2 is moving down to perform the cutting operation. During the upward or return movement of the knife, the part or cam holds the valve 38 open, so that at the end of the down or cutting movement of the knife, the two hand control may be released, but the machine will complete its return or opening movement.

The valve 38 is of the combined intake and exhaust type and comprises a movable member 42 in the casing having a normally closed intake valve head 43 and a normally open exhaust valve head 44, and a spring 45 holding the valve member 42 in its normal position. The valve member 42 is, as here shown, operated against the spring by a lever 46 pivoted at 47 to the valve casing and having a pin thrusting against the end of a stem 48 on the movable member 42 of the valve. The lever may be actuated by the two hand control in any suitable manner, here shown, as by a diaphragm 49 located in a diaphragm chamber 50 and thrusting against the head of a sliding plunger 54, which in turn thrusts against the lever 46, or an adjustable thrust screw thereon. The flow of air to the pressure side of the diaphragm chamber 50 is through a pipe 52 having a pilot valve 53 (Figure 1) therein, which is operated by the two hand control.

The two hand control may be of any suitable construction, that here shown being of the type shown in the Page Patent No. 2,046,531, dated July 7, 1936. It includes generally a lever or whiffle-tree 54ª pivoted at 55 between its ends and also a bodily rectilinear movement, due to a slot 56 therein, through which the pivot extends, a pair of manuals, means for transferring the operating movements of the manuals to opposite ends of the lever, and means for transferring the rectilinear movement only of the lever 54ª to the pilot valve 53. The lever 54ª has an angular arm 57 normally in line with a sliding plunger 58 which thrusts against the stem 59 of the movable valve member of the pilot valve 53 and which operates the plunger to open the pilot valve, when the lever is actuated rectilinearly by the operation of both manuals simultaneously, but which shifts out of alinement with the plunger upon tilting movement of the lever 54ª effected by the operation of only one manual.

60, 61 designate the manuals. The operating movement of the manuals is transferred to the opposite ends of the lever 54ª through pressure-operated devices instead of directly thereto through mechanical connections, as links, as in the Page patent above referred to.

The pressure-operated devices are here shown as of the cylinder and piston type. 62, 63 designate the cylinders; 64, 65 the pistons in the cylinders respectively, and having their rods pivoted at 66, 67 to opposite ends of the lever 54ª. The pistons are preferably acted upon by returning springs 68, 69.

The flow of pressure fluid to the cylinder is controlled by valves 70, 71, the movable members of which are operated by the manuals 60, 61, which are usually of the push button type. Pipes or hose 72, 73 connect the outlet of the valves and the cylinders 62, 63. The pilot valve 53 and valves 70, 71 are connected by pipes or hose 75, 76 to the main air line 37.

The master valve lever 46 has a roller 77 coacting with a cam on the transmission shaft 6. The cam has a dwell surface 78 and a lift surface 79. The dwell surface 78 is shown as the periphery of the shaft and the lift surface as on an arcuate piece secured to the shaft. The shaft makes one revolution during each machine operation, and hence the dwell surface extends half way around the shaft. Normally the roller 77 is located at one end of the dwell portion.

Upon substantially simultaneous operation of both manuals 60, 61, the valves 70, 71 will be opened to the intake of air through the pipes 72, 73 and closed to the exhaust of air, so that air passes through the pipes 72, 73 to the cylinders 62, 63, actuating the pistons therein to shift the lever 54ª rectilinearly without tilting. The rectilinear movement operates the movable member of the pilot valve 53 to open it to the intake of air through the pipe 74 and the outlet of air through pipe 52 to the diaphragm chamber 50, so that the diaphragm 49 is actuated to open the intake valve head 43 and close the exhaust valve head 44 of the master valve 38. Air now passes from the main line 37 through pipe 37ª, valve 38, pipe 39 to the cylinder 29 and actuates the piston 30 therein. This operation of the piston effects the throwing in of the clutch section 15 and the release of the brake band 17. The drive shaft 5 is now clutched to the small gear or pinion 7, so that it drives the transmission shaft 6 through the gear 8. The transmission shaft actuates the knife carrying head 1, as previously explained, or as in any square cutter of this type.

The motion of the diaphragm 49 is transferred to the movable member of the valve 38 through the lever 46, hence when the valve 38 is opened, the roller 77 on the lever 46 is moved radially away from the dwell surface 78 and will remain separated therefrom as long as the operator holds manuals 60, 61 depressed, while the roller is opposite the dwell portion. The roller is opposed to the dwell surface 78 while the knife is moving down toward and through the work being cut. When the down or cutting movement of the knife is completed, the roller comes opposite the lift surface 79 of the cam, so that the operator can release the manuals, and the valve 38 will be held open during the opening or "up" movement of the knife, until the roller 77 again gets back into starting position (Figure 3) at the advance end (with respect to the direction of rotation of the shaft 6, as indicated by the arrow—Figure 3) of the dwell surface 78.

The operation of only one manual results in a tilting of the lever 54ª and shifting of the arm 57 laterally out of line with the pilot valve operating plunger 58. Obviously, the subsequent operation of the other manual would be ineffective to operate the plunger 58 and the substantially simultaneous operation of both manuals required to open the pilot valve 53 or effect the operation of the machine. Upon the closing of the intake valve head 42 and opening of the exhaust valve head 44 of the valve 38, the air exhausts from the cylinder 29 back through pipe 39 and out through the exhaust passage 44ª controlled by the exhaust valve head 44. The piston 32 in cylinder 31 being under constant pressure immediately operates to disengage the clutch and to apply the brake.

In this type of machine, when a replacement knife is to be installed, the power is disconnected from the drive shaft, and the actuating mechanism worked manually, or the drive shaft turned by hand, until the knife is in its lowermost position. The knife is then removed, and the replacement knife installed.

A feature of this invention in connection with the pneumatic control is a pneumatic power mechanism for inching the actuating mechanism when installing a knife. This mechanism consists of power means for releasing the brake and inching the transmission shaft 6 when the clutch is disengaged. The drive shaft is, however, usually disconnected from its power drive when a knife is being installed. This consists of a pressure motor, as a cylinder 80 and piston 81, the piston rod having a head 82 at its outer end formed with a ratchet tooth 83 for coacting with the teeth of the gear 8 during each power impluse on the piston 81. The piston moves in a general direction tangentially to the gear 8 and the cylinder 80 is pivoted at 84 to have an oscillating movement during reciprocation of the piston. The oscillating movement is resisted by a spring 85. This piston is single-acting, and it is returned to starting position by a spring 86.

The brake releasing means comprises a cylinder 87 and piston 88 therein having its rod 89 connected at 90 to the lever 26. The cylinder 87 is pivoted at 91 to the frame of the machine. The piston is single-acting, and it is returned to starting or normal position by a spring 92 connected to the lever 26. The cylinders 80, 87 are connected in parallel in the power line through pipes 93, 94.

As seen in Figure 4, the flow through the pipes 93, 94 from a pipe 95 connected in the power line 37, may be controlled by a manually operable valve 96 of the combined intake and exhaust type or a construction similar to that of the valve 38. Upon the operation of the valve by the manual 97, air enters both cylinders 87, 80 to release the brake, and cause the gear 8 to be rotated an amount equal to the throw of the piston 81. An operation of the manual is required for each throw of the piston 81 or each "inching" operation.

The flow to the cylinders 80, 87 may be effected by operating the two hand control manuals 60, 61 by first turning the valve member 98 of a four-way valve 99 to cut out the master valve 38 and cut in the cylinders 80, 87 in the feed line subject to the operation of the two hand control. The valve 99 is located in the pilot valve line 52, so that compressed air from the pilot valve 53 may be directed to the diaphragm chamber 50, or to the inching cylinders 80, 87. As shown in Figures 2 and 3, the four-way valve 99 is normally set to direct the compressed air to the diaphragm chamber 50, while the inching cylinders 80, 87 are connected to the exhaust port 100 of the four-way valve 99. If the four-way valve 99 is set to the dotted line position, as shown in Figure 3, the compressed air from the two hand controlled pilot valve 53 will be directed to the inching cylinders 80, 87 and the diaphragm chamber 50 of the master valve 38 will be open to atmosphere through the exhaust port 100 of the valve 99. To insure power cut off of the electric motor, which drives the shaft of the machine, during inching operation, the four-way valve 99 may have interlocking connections which open the switch 105 of the electric motor 106 which actuates the drive shaft 5 of the machine. These connections may be links 107 between the switch operating lever 107ª and an arm actuated by the handle 108 of the cut-out valve 99.

As previously described herein, in the event of the compressed air failure during descending movement of the cutting knife, the spring 40 in the cylinder 29 will return the operating lever 19 to its "stop" position. In some instances, where extreme precaution is required, the spring is undesirable, due to the fact of spring fatigue, breakage, etc. In the modified form shown in Figure 5, the spring 40 is replaced by a counterweight 110. The counterweight 110 is adjustably mounted on the lever 111, which freely rocks on the operating shaft 20. As previously mentioned, the operating lever 19 is keyed to the shaft 20, thus rotation of the shaft 20 will actuate the lever 19. On one end of the shaft 20 is keyed a cam 112 for coacting with a lug 113 of the counterweight lever 111. The lever 111 is held in its uplifted position wherever the cam 112 is spaced from the lug 113 and the control member 19 normally free of the lever 111 and weight 110, by the air pressure in the cylinder 114, which has a direct source of the compressed air supply from the air line 37 through the pipe 115. When compressed air in the main air line is sufficient to operate the machine, the air pressure in cylinder 114 urges the piston 116 upward and through the piston rod 117 pivoted to the lever 111 at 118 overcomes the gravity of the weight 110 and releases the cam 112, thus permitting the free operation of the shaft 20. The other end of the cylinder 116 is pivoted to the machine frame at 119. In the event of compressed air failure, the counterweight 110 drops, and the lug 113 of the counterweight lever 111 engages the cam 112 and throws the shaft 20 and lever 19 in inoperative position and stops the machine. The cam 112 and lug 113 being normally spaced apart from a lost-motion connection which must be taken up by dropping of the weight lever 111 in order that the lever 111 may actuate the control member into its starting position, the lost motion is taken up when the air pressure fails.

What I claim is:

1. In a machine embodying an element having an operating movement dangerous to the operator during a portion of its cycle of movement, transmission mechanism for actuating said element, a drive shaft, a clutch for controlling the actuation of the transmission mechanism by the drive shaft including a shiftable member, and a brake for stopping said mechanism when the clutch is released; the combination of power means for controlling the clutch and brake operation including a control member connected to the shiftable clutch member and to the brake, pressure motors, conduits through which motive fluid is supplied to the motors respectively, the motors acting in opposite directions on said control member, one to shift the same to engage the clutch and release the brake, and the other to release the clutch and apply the brake, the motor operating to engage the clutch and operating with sufficiently greater force on the control than on the other member to overcome the latter, a normally closed valve in the conduit supplying the former motor, the latter motor being in open communication through the other conduit with the source of motive fluid, two hand control means for controlling the opening of said valve, and means operated by the transmission mechanism after the two hand control has been held operated a sufficient time to permit the machine to pass through the dangerous portion of its cycle of movement to hold the valve open during the remainder of the cycle of movement of the machine.

2. In a machine embodying an element having an operating movement dangerous to the operator during at least a portion of its cycle of movement, transmission mechanism for actuating said element, a drive shaft, a clutch for controlling the actuation of the transmission mechanism by the drive shaft including a shiftable member, and a brake for stopping said mechanism when the clutch is released; the combination of power means for inching the transmission mechanism independently of the control member including a reciprocating, single-acting, power-operated motor, a spring for returning the reciprocating member of the motor to starting position when the pressure is released, and an operator-operated valve for controlling the flow of motive fluid to the motor.

3. In a machine embodying an element having an operating movement dangerous to the operator during at least a portion of its cycle of movement, transmission mechanism for actuating said element, a drive shaft, a clutch for controlling the actuation of the transmission mechanism by the drive shaft including a shiftable member, and a brake for stopping said mechanism when the clutch is released; the combination of power means for controlling the clutch and brake operation including a control member, pressure motors acting in opposite directions on said control member, one to shift the same to engage the clutch and release the brake, and the other to release the clutch and apply the brake, operator-operated means for controlling the flow of motive fluid to the motor operating to engage the clutch, means for actuating the transmission mechanism independently of the drive shaft and the clutch, when the clutch is released, and for releasing the brake, comprising a reciprocating, single-acting motor coacting with a portion of the transmission mechanism, the motor including a spring for returning its reciprocating member to starting position, a second motor acting on the brake to release the same, a motive fluid conduit for the motors in which the motors are connected in parallel, and valve means for controlling the flow of motive fluid through the conduit.

4. In a machine embodying an element having an operating movement dangerous to the operator during at least a portion of its cycle of movement, transmission mechanism for actuating said element, driving means for the transmission mechanism, and means for controlling the actuation of the transmission mechanism and the stopping of the same including a shiftable control member shiftable in one direction to start and actuate the transmission mechanism, and back in the opposite direction to starting position to stop the same, a feed line for a pressure fluid, pressure fluid motors acting in opposite directions on said control member, the motor acting on the control member to start and actuate the transmission mechanism acting with sufficiently greater force on the control member than the other motor to overcome the latter, the latter being in open communication with the feed line, a counterweight connected thereto by a lost motion connection permitting the control member to be operated independently of the weight, and a pressure-operated motor connected in the feed line and having its movable member connected to the counterweight to normally hold it at the beginning of its lost motion connection and permit it, upon failure of pressure in the last-mentioned pressure-operated motor, to take up the lost motion and actuate the control member to starting position.

5. In a machine embodying an element having an operating movement dangerous to the operator during at least a portion of its cycle of movement, transmission mechanism for actuating said element, driving means for the transmission mechanism, means for controlling the actuation of the transmission mechanism and the stopping of the same including a shiftable control member, a feed line for a pressure fluid, pressure-operated motor means for actuating the control member, pressure-operated motor means for inching the transmission mechanism independently of the driving means, a conduit system for a motive fluid having a master valve therein for controlling the flow of fluid to the motor means operating the control member, and conduits for controlling the flow of motive fluid to the motor means of the inching mechanism, a change-over and cut-out valve in said conduits normally arranged to cut in the master valve and cut out the flow of air to the inching motor means and shiftable into the reverse position, and a two hand control mechanism operable to permit the flow of air to the master valve through the change-over valve or to the inching mechanism through the change-over valve.

6. In a machine embodying an element having an operating movement dangerous to the operator during at least a portion of its cycle of movement, transmission mechanism for actuating said element, driving means for the transmission mechanism, means for controlling the actuation of the transmission mechanism and the stopping of the same including a shiftable control member, a feed line for a pressure fluid, pressure-operated motor means for actuating the control member, pressure-operated motor means for inching the transmission mechanism independently of the driving means, a conduit system for a motive fluid having a master valve therein for controlling the flow of fluid to the motor means operating the control member, and conduits for controlling the flow of motive fluid to the motor means of the inching mechanism, a change-over and cut-out valve in said conduit system normally arranged to cut in the master valve and cut out the flow of air to the inching motor means and shiftable into the reverse position, a two hand control mechanism operable to permit the flow of air to the master valve through the change-over valve or to the inching mechanism through the change-over valve, the machine having an electric motor for the driving mechanism of the machine, a switch in the circuit of said motor, and means operated by the shifting of the change-over and cut-out switch when operated to cut out the master valve, to open said switch 7. In a machine embodying an element having an operating movement dangerous to the operator during at least a portion of its cycle of movement, transmission mechanism for actuating said element, a drive shaft, a clutch for controlling the actuation of the transmission mechanism by the drive shaft including a shiftable member, and a brake for stopping said mechanism, when the clutch is released; the combination of power means for controlling the clutch and brake operations including a shifting lever coacting with the shiftable clutch member to shift the same, a pressure motor connected to said lever to actuate the same in one direction to shift the clutch "in," a second pressure motor connected to the brake to apply the same, and connections between the second motor and said lever to actuate the same in a direction opposite to that in which it is actuated by the first motor, the first motor operating with sufficiently greater force on said lever to overcome the force of the second motor, the second motor being in open communication with a source of motive fluid, and operator-operated means for controlling the flow of motive fluid to the first motor.

BASIL J. YANCHENKO.